Aug. 25, 1936.  G. W. HUFF  2,052,094
SAFETY STEERING DEVICE
Filed Jan. 25, 1934  2 Sheets-Sheet 1
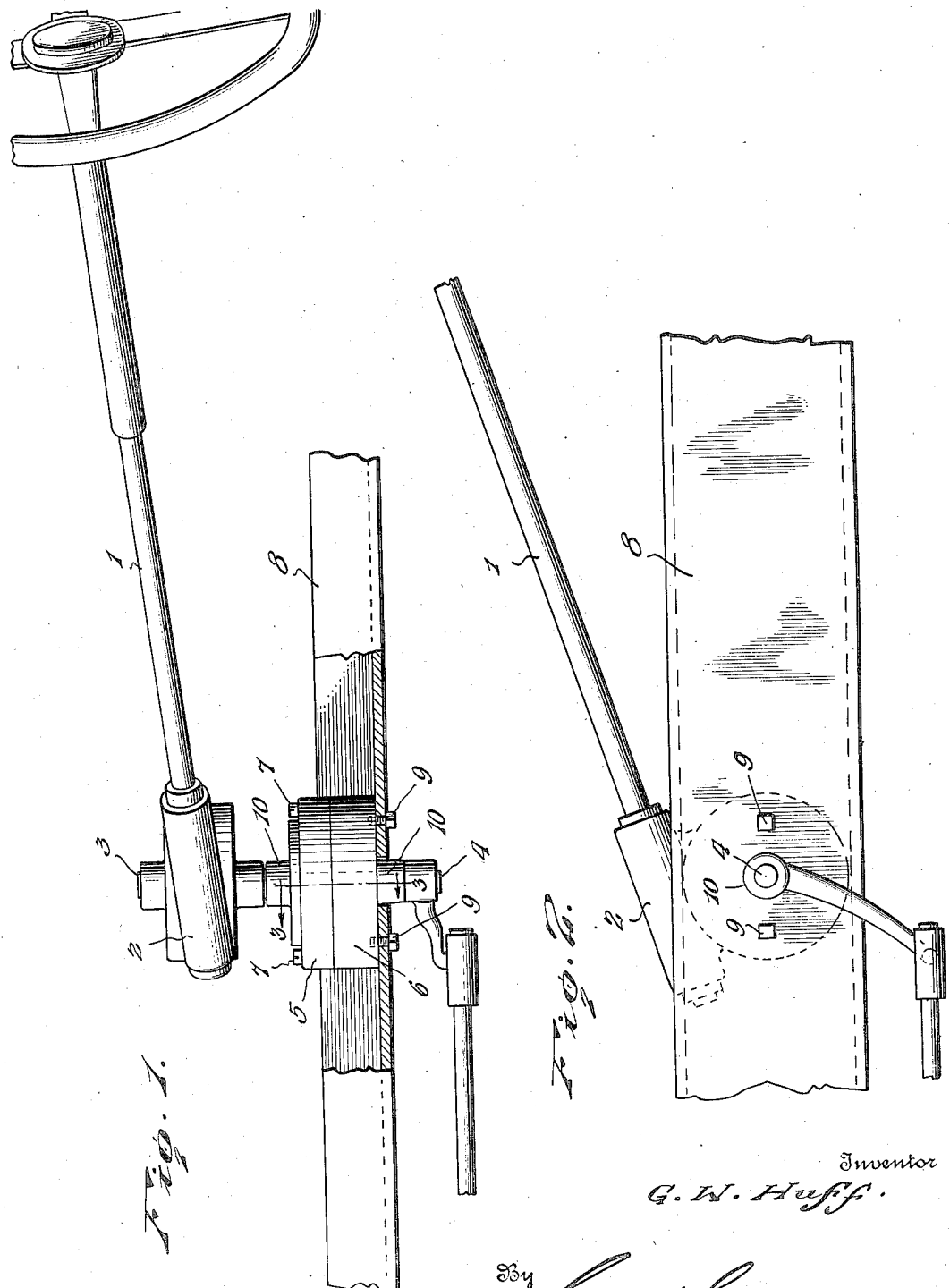

Aug. 25, 1936.   G. W. HUFF   2,052,094
SAFETY STEERING DEVICE
Filed Jan. 25, 1934    2 Sheets-Sheet 2
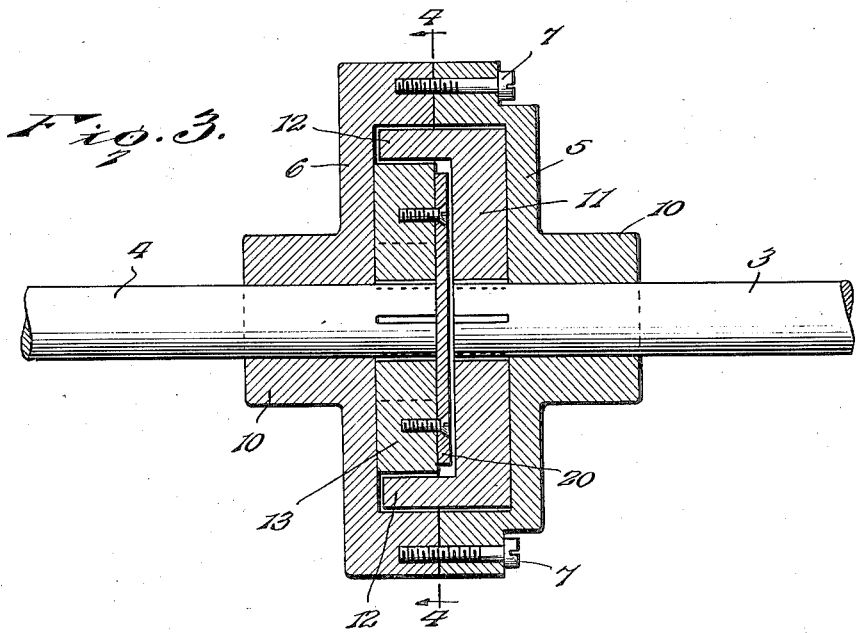
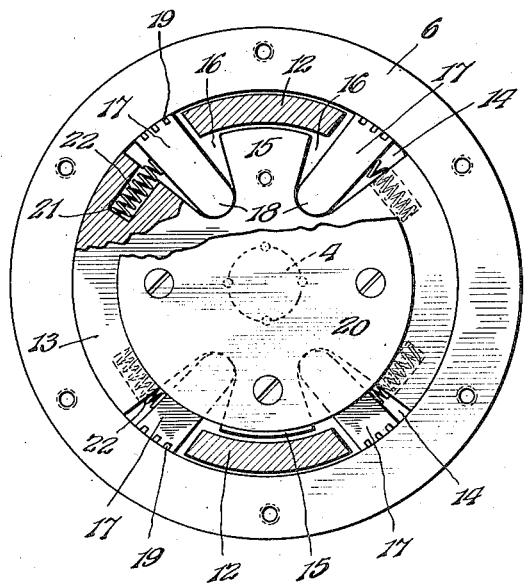
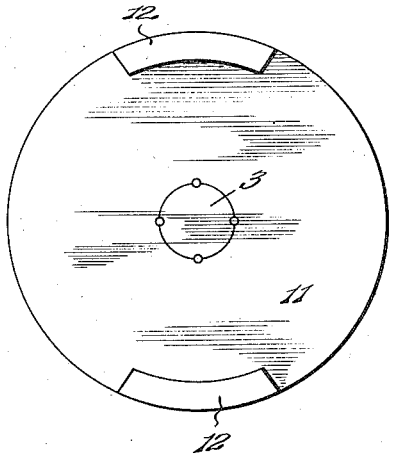
Inventor
G. W. Huff.
By Lacey & Lacey, Attorneys Patented Aug. 25, 1936

2,052,094

UNITED STATES PATENT OFFICE 2,052,094

SAFETY STEERING DEVICE

George W. Huff, Keokuk, Iowa

Application January 25, 1934, Serial No. 708,301

2 Claims. (Cl. 192—8)

This invention relates to steering mechanism and has for its object the provision of means whereby the wheels of an automobile may be set to guide the vehicle in a desired direction and in which, if the hold upon the controller be released, the wheels will be locked in the position in which they have been set. It is also an object of the invention to provide a mechanism for the stated purpose which will be very simple and compact and may be readily applied to existing automobiles as well as to automobiles in the process of manufacture and which will depart but slightly in appearance from the ordinary steering column in common use. While the invention is designed primarily for application to automobiles, it is applicable to all mechanisms in which a one-way control is desirable. The invention is illustrated in the accompanying drawings and will be hereinafter fully described, the novel features being particularly pointed out in the appended claims.

In the drawings,

Figure 1 is a plan view of a portion of a steering mechanism embodying the invention, Figure 2 is a side elevation of the same, Figure 3 is an enlarged section on the line 3—3 of Figure 1, Figure 4 is a section on the line 4—4 of Figure 3, Figure 5 is a face view of the controller disk.

In carrying out the present invention, the steering rod 1 is mounted in the usual manner and operates through worm gearing, indicated at 2, to rotate a driving shaft 3, said shaft being alined with a driven shaft 4 which is coupled to the radius rods or spindles of the steering ground wheels in the usual manner, as will be understood upon reference to Figures 1 and 2. The opposed ends of the shafts 3 and 4 are housed in a casing consisting of mating members 5 and 6 which are secured together by bolts 7 inserted through their margins and held rigidly upon a sill or other channeled member 8 of the automobile or other vehicle by bolts 9 or other convenient means which will firmly hold the parts together. The shafts 3 and 4 are rotatably fitted in the casing, the parts of which are provided with external hub members, indicated at 10, to provide firm supports for the shafts and hold them in alinement. Upon reference to Figure 3, it will be noted that the casing members 5 and 6, are in the form of disks having marginal rims or flanges confronting each other whereby a circular chamber is defined within the casing and to the end of the driving shaft 3 within the casing there is keyed or otherwise secured a controller disk 11 which has an external diameter slightly less than the internal diameter of the casing whereby it may be readily rotated in the casing without appreciable frictional resistance. At diametrically opposite points on this controller disk 11, at the periphery of the same, are lugs 12 which are adapted to release locking dogs, as will presently appear. Disposed within the casing section 6 is a disk 13 which is provided at diametrically opposite points of its periphery with recesses 14 in which the lugs 12 play, and midway the ends of the respective recesses are formed tongues 15 which are disposed radially and cooperate with the end walls of the respective recesses to define notches 16 in which locking dogs 17 are seated. These locking dogs have convex inner ends, as shown at 18, whereby they may rock readily in the bases of the recesses in the disk 13 while the outer ends of the dogs are preferably serrated or otherwise roughened, as indicated at 19, in order that they may firmly engage the inner periphery of the casing section and thereby lock the disk to the casing section. The disk 13 is keyed or otherwise secured to the end of the driven shaft 4 and a keeper plate 20 is secured to the face of the disk to extend over the ends of the locking dogs and thereby retain the dogs in operative position. In each end wall of the recesses 14 is a pocket 21 in which is disposed an expansion spring 22 which bears upon the side of the respectively adjacent locking dog.

The construction and arrangement of the several parts of the device having thus been made known, the operation will be readily understood. When the parts are at rest they will occupy the positions shown most clearly in Figure 4, with the lugs 12 out of contact with both adjacent locking dogs and the dogs pressed into locking engagement with the rim of the casing member 6 by the respective springs 22. When the position of the ground steering wheels is to be changed so that the vehicle will move to one side, the steering rod 1 is turned in the proper direction and will thereby cause the lugs 12 to impinge against diametrically opposite dogs 17 and move them against the force of the respective springs 22 so that the dogs will be released from the casing member. The continued movement of the steering rod and the lugs 12 will then be transmitted through the dogs to the respective end walls of the recesses 14 so that the disk 13 will be turned in the proper direction and the driven shaft 4 will follow the movement to set the ground wheels. When the movement of the steering rod ceases, the springs will at once expand and cause the dogs to again grip the casing member so that the wheels will be held in the position in which they have been set. Assuming, for example, that the steering rod has been turned so that the controller disk 11 will move counter-clockwise, the upper lefthand dog 17 and the lower righthand dog will be engaged by the respective lugs of the controller disk and the springs acting on said dogs will be compressed. The pressure being continued through the lugs 12, the disk 13 will be turned about its center while the engagement of the upper righthand dog 17 and the lower lefthand dog with the casing section 6 will hold the outer ends of these latter dogs relatively stationary, the inner ends of the dogs rocking in their seats and moving with the disk 13 so that their outer ends will then be released from the casing and the driving shaft 3 may be turned to set the wheels. If reverse movement, however, be attempted by force exerted upon the ground wheels, the lugs 12 will return to a position midway or out of contact with the respective locking dogs and the springs will then be free to expand and cause the dogs to resume locking engagement with the casing so that the efforts to move the ground wheels will be frustrated.

It will thus be seen that I have provided an exceedingly simple and compact mechanism which may be applied to any automobile and by the use of which the vehicle may be steered according to present practice but all efforts to release the ground wheels from a relatively angular position by an outside force will be prevented so that unauthorized use of the vehicle cannot be had. While the device is designed primarily for use upon automobiles, it may be applied to airplanes and all other mechanisms wherein a one-way control is desirable.

Having thus described the invention, I claim:

1. A safety steering device comprising alined shafts, a stationary casing rotatably housing the meeting ends of said shafts, a locking disk secured to the end of one shaft and provided with oppositely disposed peripheral recesses, notches in the side walls of the recesses at the ends thereof and pockets in the end walls of said recesses, locking dogs seated in said notches and adapted to rock therein, the outer ends of the dogs being adapted to engage the casing and lock the disk thereto, springs seated in the pockets in the disk and bearing against side faces of the respectively adjacent dogs to yieldably hold them in locking engagement with the casing, the outer ends of the dogs having gripping surfaces, a controller disk secured upon the other shaft and having diametrically opposite arcuate marginal lugs engaged in the recesses in the locking disk and disposed between the locking dogs in the respective recesses and movable longitudinally in the recesses circumferentially of the locking disk whereby turning movement of the controller disk in either direction will release the locking dogs and effect turning of the locking disk and the corresponding shaft, and a covering plate between the opposed ends of the shafts and secured upon the locking disk over the recesses therein and the dogs in the recesses.

2. A safety steering device comprising alined driving and driven shafts, a stationary casing having companion sections detachably secured to each other about adjoining end portions of the shafts and defining an annular chamber having the adjoining ends of the shafts extending therein, discs secured upon said shafts within said chamber and rotating with the shafts, the disc carried by the driven shaft being formed with a circumferentially extending recess in its peripheral face and having extensions projecting inwardly therefrom and forming pockets spaced from each other circumferentially of the disc and disposed radially thereof, locking dogs extending radially of the disc and seated in the pockets for pivotal movement therein in a direction circumferentially of the disc, springs for imparting pivotal movement to said dogs and urging the same into position to dispose outer ends of the dogs in position to frictionally grip the peripheral wall of the casing and prevent rotation of the driven shaft, a plate detachably secured against the inner side face of said disc and located between the discs with portions overlapping side faces of said dogs to hold the dogs against transverse movement out of the pockets, and an arcuate lug extending from the other disc into the recess between the dogs for individually engaging the dogs when the driving shaft is rotated and selectively moving the dogs out of gripping engagement with the casing.

GEORGE W. HUFF.